Patented July 5, 1932

1,866,501

UNITED STATES PATENT OFFICE

EDWARD T. HOWELL, OF MILWAUKEE, WISCONSIN, ASSIGNOR, BY MESNE ASSIGNMENTS, TO E. I. DU PONT DE NEMOURS & COMPANY, A CORPORATION OF DELAWARE

PROCESS FOR PRODUCING OXIDIZED DIBENZANTHRONE

No Drawing.    Application filed August 15, 1931.    Serial No. 557,380.

This invention relates to a process for producing dibenzanthrone dyestuffs. More particularly, it deals with a process for producing oxidized dibenzanthrone by the oxidation of 2,2'-dibenzanthronyl.

In U. S. Patent No. 1,564,423 (Example 13) is described a method whereby an intermediate product produced according to Examples 1 to 4 of the same patent, and which apparently constitutes crude 2,2'-dibenzanthronyl, is subjected to oxidation by means of manganese dioxide in concentrated sulfuric acid, whereby a dyestuff is produced which appears to be an oxidized form of dibenzanthrone. The preferred medium in which the manganese dioxide oxidation is carried out is therein specified as "concentrated sulfuric acid", which in view of the accepted meaning of this term in the dyestuff art evidently designates 66° Bé. (93%) sulfuric acid.

I have now found that if the aforementioned oxidation with manganese dioxide is carried out in a somewhat more dilute sulfuric acid medium, more particularly sulfuric acid of 82 to 85% strength, the product precipitates directly in a high state of purity and may be isolated by direct filtration of the reaction mixture. Two distinct advantages over the process using concentrated sulfuric acid are thus effected. In the first place, the product by my invention is considerably purer than the product obtained according to the old process, and hence does not have to be subjected subsequently to any purifications. Secondly, since the product precipitates directly from the reaction mass, it is not necessary to drown the reaction mass in water as disclosed in said patent, thereby eliminating the necessity of filtering large volumes of liquid.

I have further found that if, instead of starting with crude 2,2'-dibenzanthronyl as obtained, for instance, in the caustic fusion of benzanthrone, I select as initial material a purified 2,2'-dibenzanthronyl, obtained for instance by subjecting the crude material to recrystallization from a solvent, the resultant yield of dyestuff is considerably increased as measured by its tinctorial value. In other words, by combining the two features above mentioned, namely by selecting pure 2,2'-dibenzanthronyl as initial material and by carrying out the condensation in sulfuric acid of about 82 to 85% strength, the tinctorial yield of the product is considerably increased, and the purity of the same is so high that it may be used directly for alkylation without any intervening purification steps.

The tinctorial yield of the dyestuff is determined by alkylating the same to produce a dyestuff of the jade green series (Colour Index No. 1101), and comparing dyeings produced with the same upon cotton against a standard sample.

The concentration of the sulfuric acid above, may be reduced by the aid of water, acetic acid or any other inert diluent.

Although best results are obtained with sulfuric acid of about 82 to 85% strength, it will be understood that the concentration of the acid may be varied somewhat beyond said limits. Thus, at a concentration of about 88% the improvement in purity is already noticeable. On the other hand, the lower limit of concentration may be carried as far as 80% without seriously affecting the yield.

The following specific examples will serve further to illustrate my invention, it being understood that the same are merely illustrative, not limitative. Parts given are parts by weight.

*Example 1*

50 parts of commercial 2,2'-dibenzanthronyl (containing about 80% of pure 2,2'-dibenzanthronyl) are dissolved in 1250 parts of 93% sulfuric acid and 150 parts of water are slowly added with cooling. The mixture is now cooled to 10° C. and 75 parts of manganese dioxide are introduced with stirring over a period of 2 to 3 hours, care being taken that the temperature does not rise above 10 to 15° C. The mixture is now allowed to warm up to room temperature and is stirred at this temperature for 15 hours. Examination of the reaction mixture at this stage under the microscope shows comparatively large, brown, needle-like prisms with clear background. The magma is filtered, and the filter cake is suspended in 1000 parts of water, 50 parts of sodium bisulfite are added and the mass is boiled, filtered, and washed acid free. The yield of dry product amounts to about 84% of the initial material, but consists of an exceptionally pure product suitable for direct conversion into dyestuffs of the jade green series by alkylation. The impurities removed by the strong acid filtrate contain practically nothing of tinctorial value as shown by dyeings, thus indicating a highly efficient separation between the dyestuff and its impurities.

*Example 2*

25 parts of crystalline 2,2'-dibenzanthronyl (as may be obtained, for instance, by dissolving crude 2,2'-dibenzanthronyl in hot nitrobenzol, filtering through animal charcoal and cooling to crystallize out 2,2'-dibenzanthronyl in a high state of purity), are dissolved in 625 parts of 93% sulfuric acid and 78 parts of water are added slowly with cooling to reduce the acid concentration to about 82.5%. The mixture is now cooled to about 2 to 5° C. and 33 parts of manganese dioxide (86 to 87% pure) are added slowly over a period of about 2 hours, the temperature of the reaction mass being maintained at about 2 to 5° C. The mixture is now warmed up to room temperature and is stirred at this temperature for about 15 hours. It is now filtered and the filter cake is further freed from adhering liquids by suction. It is now digested in water containing 33 parts of sodium bisulfite, filtered, and washed acid free. The product thus obtained when methylated according to U. S. Patent 1,531,261, gives jade green of exceptionally high purity and great tinctorial strength.

It will be understood that my invention is susceptible of various modifications without departing from the spirit of the same.

I claim:

1. In the process of preparing an oxidized dibenzanthrone by reacting upon 2,2'-dibenzanthronyl with manganese dioxide and sulfuric acid, the improvement which comprises effecting the reaction in a sulfuric acid concentration not higher than 88% and not lower than 80%.

2. In the process of preparing an oxidized dibenzanthrone by reacting upon 2,2'-dibenzanthronyl with manganese dioxide and sulfuric acid, the improvement which comprises effecting the reaction in a sulfuric acid concentration of about 82 to 85%.

3. In the process of preparing an oxidized dibenzanthrone by reaction upon 2,2'-dibenzanthronyl with manganese dioxide and sulfuric acid, the improvement which comprises selecting as initial material a purified form of 2,2'-dibenzanthronyl as obtainable by recrystallizing crude 2,2'-dibenzanthronyl from a solvent, and effecting the reaction in a sulfuric acid concentration not higher than 88% and not lower than 80%.

4. In the process of preparing an oxidized dibenzanthrone by reacting upon 2,2'-dibenzanthronyl with manganese dioxide and sulfuric acid, the improvement which comprises selecting as initial material a purified form of 2,2'-dibenzanthronyl as obtainable by recrystallizing crude 2,2'-dibenzanthronyl from a solvent, and effecting the reaction in a sulfuric acid concentration of about 82 to 85%.

5. The process of preparing an oxidized dibenzanthrone which comprises effecting a solution of substantially pure, crystalline 2,2'-dibenzanthronyl in sulfuric acid of about 82 to 85% concentration, adding manganese dioxide, stirring, filtering the reaction mass and recovering the filter cake.

In testimony whereof, I have hereunto subscribed my name at Carrollville, in the county of Milwaukee, in the State of Wisconsin.

EDWARD T. HOWELL.